United States Patent
Sarin (10) Patent No.: US 10,284,551 B2
(45) Date of Patent: May 7, 2019

(54) ELECTRONIC MECHANISM TO SELF-AUTHENTICATE AND AUTOMATE ACTIONS

(71) Applicant: PAYPAL, INC., San Jose, CA (US)

(72) Inventor: Pankaj Sarin, New Delhi (IN)

(73) Assignee: PAYPAL, INC., San Jose, CA (US)

( * ) Notice: Subject to any disclaimer, the term of this patent is extended or adjusted under 35 U.S.C. 154(b) by 102 days.

(21) Appl. No.: 15/170,679

(22) Filed: Jun. 1, 2016

(65) Prior Publication Data
US 2017/0353448 A1 Dec. 7, 2017

(51) Int. Cl.
| | |
|---|---|
| H04L 29/06 | (2006.01) |
| H04W 4/02 | (2018.01) |
| G06K 9/00 | (2006.01) |
| H04W 4/00 | (2018.01) |
| H04W 12/06 | (2009.01) |
| H04W 88/02 | (2009.01) |
| H04W 4/80 | (2018.01) |

(52) U.S. Cl.
CPC ...... H04L 63/0853 (2013.01); G06K 9/00013 (2013.01); G06K 9/00228 (2013.01); H04L 63/0861 (2013.01); H04L 63/107 (2013.01); H04W 4/02 (2013.01); H04W 4/80 (2018.02); H04W 12/06 (2013.01); H04W 88/02 (2013.01)

(58) Field of Classification Search
CPC ............... H04L 63/0853; H04L 63/107; H04L 63/0861; H04W 12/06; H04W 4/80; H04W 4/02; H04W 88/02; G06K 9/00013; G06K 9/00228

USPC ............... 726/7; 713/186; 455/411
See application file for complete search history.

(56) References Cited

U.S. PATENT DOCUMENTS

| | | | | |
|---|---|---|---|---|
| 9,519,901 | B1* | 12/2016 | Dorogusker | G06Q 20/401 |
| 9,805,370 | B1* | 10/2017 | Quigley | G06Q 20/4014 |
| 2007/0245158 | A1* | 10/2007 | Giobbi | G06F 21/31 |
| | | | | 713/186 |
| 2014/0162598 | A1* | 6/2014 | Villa-Real | H04M 1/66 |
| | | | | 455/411 |
| 2014/0329497 | A1* | 11/2014 | Sanzgiri | H04W 12/06 |
| | | | | 455/411 |
| 2016/0189132 | A1* | 6/2016 | Cash | G06Q 20/3224 |
| | | | | 705/14.57 |

* cited by examiner

*Primary Examiner* — Shanto Abedin
(74) *Attorney, Agent, or Firm* — Haynes and Boone, LLP (57) ABSTRACT

Systems and methods for a authenticating a user on an alien electronic device is described. The system may include a first device associated with a first user and a second device associated with a second user. The first device may include a non-transitory memory and one or more hardware processors coupled to the non-transitory memory and configured to read instructions from the non-transitory memory to cause the first device to perform operations that include receiving from the second user, an identification data of the second user, determining that the identification data of the second user does not correspond to the first device, searching for the second device associated with the identification data of the second user, receiving an indication from the second device confirming that the identification data of the second user is associated with the second device, and initiating data communication between the first device and the second device.

20 Claims, 7 Drawing Sheets

ELECTRONIC MECHANISM TO SELF-AUTHENTICATE AND AUTOMATE ACTIONS

BACKGROUND

The present application generally relates to an electronic method for authenticating a user on an alien device, and more specifically to an electronic mechanism to self-authenticate and automate actions.

Personal electronic devices are utilized these days to perform a variety of functions. Such functions include storing personal information such as phone numbers and email addresses, sharing stored information with other devices, and/or conducting financial transactions such as making a payment. These functions may be performed manually on the electronic devices, for example, by manually typing in name and contact information of a friend. In other examples, if the user wants to make an electronic payment transaction to a friend, the user may log in to his bank account or a payment provider account (e.g., PAY-PAL® account) and manually initiate a payment transaction. However, these manual methods can be cumbersome to perform. Furthermore, manual performances can be prone to errors such as typographical errors. Thus, an automated method for performing such transactions in a secure manner is desirable.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. In the drawings, the relative sizes of elements, layers, and regions may be exaggerated for clarity.

In the present disclosure, reference will be made to a smartphone as an exemplary electronic device for describing various aspects of the embodiments. Therefore, even though the description will be made with reference to smartphones, the electronic devices are not limited to just smartphones but rather any other electronic devices such as tablets or laptop computers, etc., including a transaction processing device, such as a merchant point of sale (POS) device, and descriptions directed to smartphones also apply to other electronic devices. Furthermore, the terms "smartphone" and "electronic device" may be used interchangeably throughout the present disclosure.

Embodiments of the disclosure are directed to a system and a method for authenticating users on alien smartphones and automating actions between one or more smartphones. For example, when people share personal information such as phone numbers, email addresses, etc., with each other, they typically solicit such information verbally and then store that information on personal electronic devices such as a smartphone. In other instances, people may solicit business cards from each other as a way to exchange information. However, these methods can be a burden for the person having to speak or write down the information while the other person writes down or enters the information in their smartphone. Furthermore, the process of exchanging information is also prone to errors. For example, the person receiving the information may make a typographical error when entering the information into the smartphone. The person providing the information may misstate the information, or the information may be misheard by the receiving party during the exchange. Such potential for errors and the burden can be reduced by electronically exchanging information between a first smartphone and a second smartphone. For example, a first electronic device may be associated with a first person, and the first person may electronically provide data (e.g., contact information) from the first electronic device to a second electronic device that is associated to a second person.

According to an embodiment, the identity of the users of the electronic devices should be authenticated before transferring the data to ensure that the data is provided to the electronic device of the intended user. In one embodiment, a first user (e.g., a consumer) associated with a first device (e.g., a smartphone) desires to have data communicated to a second device (e.g., a merchant POS or another smartphone) associated with a second user (e.g., a merchant or another user). The first user authenticates through the second device, such as by using a biometric (e.g., placing the first user's finger on a scanner of the second device) or entering a password or PIN along with an identifier of the first user (such as a name or phone number). The second device, recognizing that the entered data is not associated with the second user, searches local devices associated with the data received by the second device. If a match is found, the second device communicates a notification of a match or authentication data to the found device (i.e., the first device). Based on the match notification and/or the authentication data, the first device then communicates information to or shares information with the second device, such as payment credentials, contact information, phones, or any suitable digital content. The first device can also receive content from the second device. Each device can then use that information as appropriate, such as the second device processing a payment transaction between the first user and the second user. Limits can be placed by the user or users on what information can be shared or actions performed in such a situation and can vary based on the type of authentication provided on the alien device (e.g., different fingerprints from different fingers of a user, different authenticators, etc.). For example, an index finger authentication may not permit a payment process, while a thumb authentication may allow funding data to be shared and a payment processed. As such, authentication can be performed on a device not associated with the user (an alien device) and digital content or data can be shared between the user device and the alien device safely after authentication.

Figure 1:
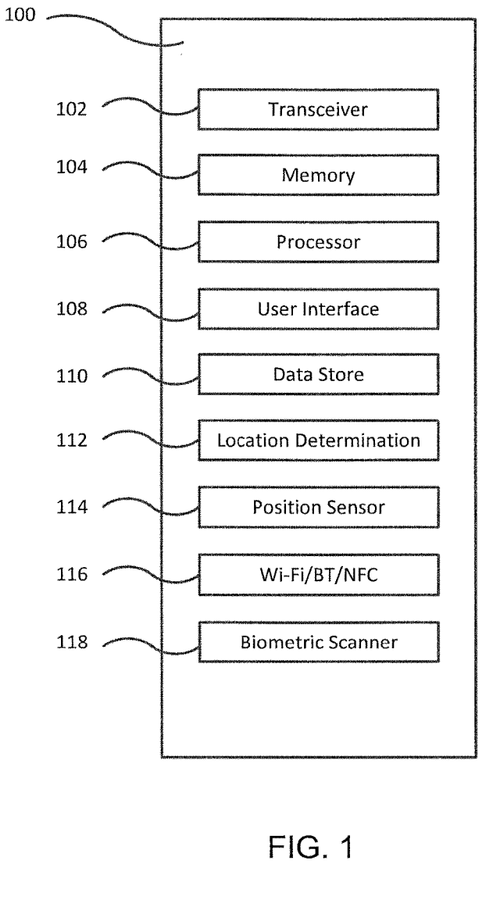
FIG. 1 is an illustration of an exemplary electronic device, according to an embodiment of the present disclosure.

FIG. 1 is a block diagram of an exemplary electronic device such as a smartphone 100, according to an embodiment. The smartphone 100 includes a transceiver 102, a memory 104, a processor 106, a user interface 108, a data store 110, a location determination system 112, a position sensor 114, wireless communication sensors 116, and a biometric scanner 118. These elements may be in direct or indirect communication with each other, for example via one or more buses.

The transceiver 102 may include a modem subsystem and a radio frequency (RF) unit and be configured to communicate bi-directionally with other devices, such as other mobile communications devices and/or networks. The memory 104 may include a cache memory (e.g., a cache memory of the processor 106), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 104 includes a non-transitory computer-readable medium.

The memory 104 may store instructions that, when executed by the processor 106, cause the processor 106 to perform the operations described herein in connection with embodiments of the present disclosure. Instructions may also be referred to as code. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The processor 106 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein and discussed in more detail below. The processor 106 may also be implemented as a combination of computing devices, e.g., a combination of a DSP and a microprocessor, a plurality of microprocessors, one or more microprocessors in conjunction with a DSP core, or any other such configuration. The processor 106 may be a single processor or multiple processors, where each processor may have one or more processing cores capable of parallel and/or sequential operation.

The user interface 108 may include an input component and an output component. For example, the user interface 108 may include a touchscreen interface that outputs data for visual use as well as receives/processes one or more touches/swipes/gestures to be potentially interpreted according to embodiments of the present disclosure such as discussed with respect to swipe interpretation system 116. Further, the user interface 108 may be used to display one or more notifications, elements of information, and application data according to embodiments of the present disclosure. The user interface 108 may also include one or more lights (e.g., LEDs) separate from a touchscreen, a vibration generator, a speaker, a microphone, input for a mouse, input for a keyboard, etc. useful for providing feedback to a user as well as receiving further input therefrom.

The data store 110 may be, for example, a hard drive, flash drive, storage array, or other type of storage. The data store 110 may store notifications, transferred information, location information, map information, and/or update information (e.g., as an "app").

In an embodiment, the location determination system 112 may include one or more transceivers to enable communication with a global navigation satellite system. The smartphone 100 may further include assisted-GPS for enhanced signal acquisition/location quality.

The position sensor 114 may be an orientation and/or motion detection component, such as a gyroscope and/or accelerometer. It may be used in combination with gesture detection according to embodiments of the present disclosure, such as for confirmation to send information to another device or to accept receipt of information from another device.

The wireless communication sensors 116 may include sensors and antennas for near field communication (NFC), Wi-Fi, and/or Bluetooth for wirelessly detecting, sensing, and/or exchanging data with other electronic devices.

The biometric scanner 118 may include a fingerprint scanner for capturing fingerprint identification data, which may be utilized, for example, as a security feature for the smartphone. Note that "identification" data can include any type of data that enables a user to be identified or authenticated, including a name, phone number, password, PIN, or biometric feature (e.g., fingerprint, retina scan, facial image, etc.). The smartphone may be configured such that a user must scan his fingerprint on the fingerprint scanner before being allowed to access the contents of the smartphone. During initial use of the smartphone, the user may configure the smartphone by scanning his fingerprint(s) and storing his fingerprint data on the smartphone so that the smartphone will recognize his fingerprint(s) when he later desires to unlock the phone by scanning his fingerprint. The smartphone may compare the fingerprint that is scanned with the fingerprint that is stored, and if the two fingerprints match, then the user may be granted access to the smartphone, for example, by unlocking the phone.

In some embodiments, the biometric scanner 118 may be a camera for capturing an image of a person (e.g., a user). The image may be a facial image of the user which can be utilized to identify the user by facial recognition.

Figure 2:
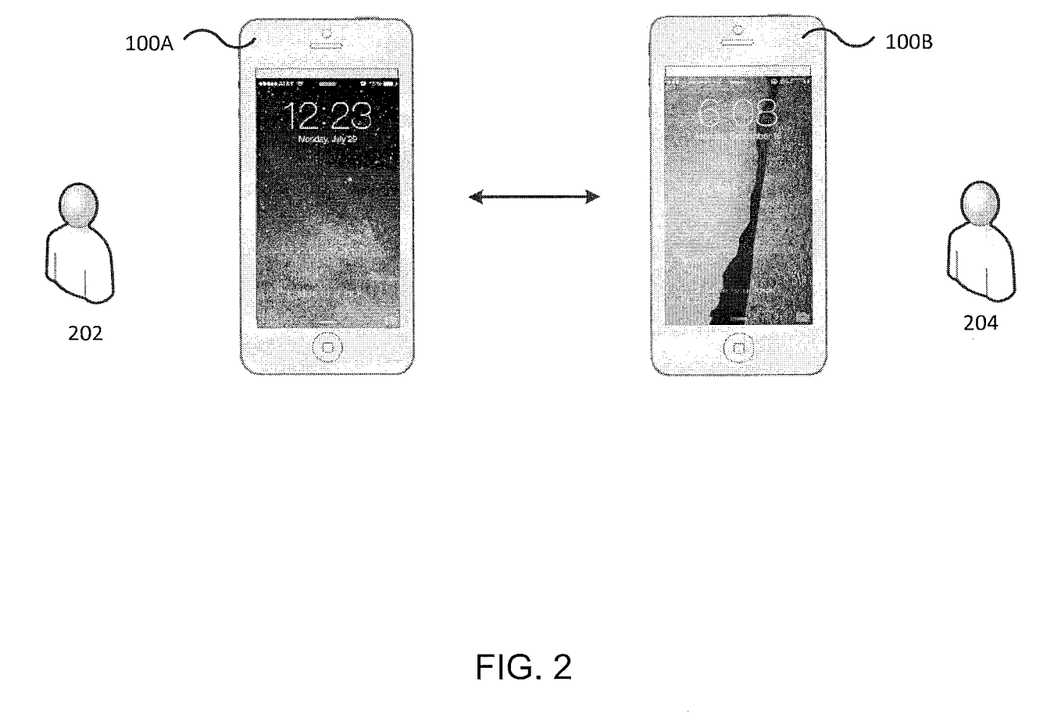
FIG. 2 is an illustration of a system including a pair of electronic devices configured to authenticate and exchange data between each other, according to an embodiment of the present disclosure.

FIG. 2 illustrates a first smartphone 100A, which is associated with a first user 202 and a second smartphone 100B, which is associated with a second user 204. According to an embodiment of the present disclosure, the first smartphone 100A is configured to recognize the first user's fingerprint and determine whether or not the first user 202 is a registered user (e.g., an authorized user) of the first smartphone 100A. More specifically, the first user's fingerprint(s) may be stored in a memory of the first smartphone 100A and when the first user 102 scans his fingerprint on the fingerprint scanner of the first smartphone, his fingerprint is compared with the stored fingerprint(s) to determine whether or not the fingerprints match. In one embodiment, multiple user fingerprints are stored, where the fingerprints can be used equally for authentication or different fingerprints can be used for different access, authentication levels, and/or actions.

In some embodiments, the first user's fingerprint may be stored in a cloud (e.g., a network server associated with a user account of the first smartphone 100A or an application that utilizes fingerprint identification such as a payment provider application) and accessed when needed by the first smartphone 100A for verification. For example, when a user's fingerprint is scanned, the smartphone may retrieve the stored fingerprint from the cloud and compare the retrieved fingerprint with the scanned fingerprint to determine whether or not the two fingerprints match. In other embodiments, when a user's fingerprint is scanned, the smartphone may transmit the scanned fingerprint to the cloud, and the network server may compare the scanned fingerprint and the stored fingerprint to determine whether or not the fingerprints match. As such, fingerprint verification is made by the network server in the cloud and the result of the verification is provided to the smartphone from the cloud.

Similarly to the first smartphone 100A, the second smartphone 100B may be configured to recognize the second user's fingerprint and determine whether or not the second user 204 is a registered user (e.g., an authorized user) of the second smartphone 100B. In this manner, smartphones 100A, 100B can be unlocked by the registered users with fingerprint identification. Fingerprint identification may also be utilized for performing various operations on the smartphones such as authorizing purchase transactions or authorizing data transfer, in addition to, or instead of entering a password.

According to an example implementation of the embodiments of the present disclosure, the first user 202 desires to have data communicated (e.g., share his contact information) with the second user 204 by sending data (e.g., his contact information) from his smartphone (i.e., first smartphone 100A) to the second user's smartphone (i.e., second smartphone 100B). In order to do this, the first smartphone 100A and the second smartphone 100B are authenticated with each other to ensure that the contact information is provided to the intended smartphone. According to the embodiment, the first user 202 scans his fingerprint on the fingerprint scanner of the second smartphone 100B instead of on his own smartphone (i.e., first smartphone 100A). When the first user 202 scans his fingerprint on the second smartphone 100B, the second smartphone 100B does not recognize the first user's fingerprint because the first user's fingerprint is not registered on the second smartphone 100B. Therefore, the second user 204 is not granted access to the contents of the second smartphone. However, the second smartphone 100B searches the vicinity of the second smartphone 100B for other smartphones that may be registered with the first user's fingerprint.

In some embodiments, the second smartphone 100B utilizes location determination system 112 to search for other smartphones that are within a set or a predetermined distance from the second smartphone 100B. The distance may be a fixed distance or it may be set by the user to a suitable distance for the given application and/or situation. According to an embodiment, the second smartphone may utilize a wireless connection such as, for example, Wi-Fi, Bluetooth, and/or NFC, to search for other smartphones within the vicinity. When the second smartphone 100B finds another smartphone (in this case, first smartphone 100A) located within range, the second smartphone 100B transmits the scanned fingerprint (i.e., the first user's fingerprint) to the first smartphone 100A over the wireless connection and compares the received fingerprint with the registered fingerprint. If the received fingerprint and the registered fingerprint match, then the first smartphone 100A and the second smartphone 100B are authenticated with each other and data may now be exchanged between the two smartphones over the wireless connection.

In some embodiments, when the received fingerprint and the registered fingerprint match, a notification (e.g., a message or acknowledgement) of the match or authentication data is sent from the first smartphone 100A (i.e., found smartphone) to the second smartphone 100B (i.e., searching smartphone). The notification may be, for example, a composite of codes or encrypted codes that the second smartphone 100B recognizes as authentic data that can only be provided by a smartphone that is registered with the first user's fingerprint (i.e., first smartphone 100A). Thus, the second smartphone 100B can be assured that data will be communicated (e.g., exchanged) with the intended smartphone. Once the two smartphones are authenticated, a plurality of codes may be freely exchanged back and forth between the two smartphones. In some embodiments, the data may include credentials that may be utilized by payment providers to conduct payment transactions. In other embodiments, the data may be codes that are utilized by social media accounts to send, for example, friend requests. Yet, in other embodiments, the data may be address book information that includes contact information utilized by smartphones, or any other suitable digital content.

In some embodiments, the first user 202 and/or the second user 204 may place limits on the amount and/or the type of information that may be communicated between the two smartphones. For example, the first user 202 may allow only his phone number to be automatically provided to the second user 204 when the two smartphones are authenticated. However, the first user 202 may manually authorized other contact information (e.g., email address, home address, etc.) depending on who the information is being provided to. In other embodiments, the smartphones may be configured such that fingerprints of different fingers of the same user (e.g., thumb vs. index finger) perform different automated actions or share different amounts of information when the two smartphones are authenticated. Furthermore, the smartphones may be configured to recognize multiple fingerprints that are scanned concurrently. For example, a fingerprint scan of the index fingerprint may authorize a payment transaction of a lower limit (e.g., $100) but a multiple fingerprint scan (e.g., fingerprints of the index finger and the middle finger scanned together) may authorize a payment transaction of a higher limit (e.g., $5,000). Accordingly, various limits and actions can be performed by enabling/disabling certain features and/or providing a variation of biometric identification.

In some embodiments, the first user's contact information may be provided directly from the first smartphone 100A to the second smartphone 100B via the wireless connection. In some embodiments, the first user's contact information may be provided from the first smartphone 100A to the second smartphone 100B through other computers such as the network server in the cloud. For example, after the authentication, the first user's contact information may be transmitted to the network server over a cellular data connection, and the network server may in turn, transmit the first user's contact information to the second smartphone 100B. The smartphones may transmit data with the network server over any suitable connections such as, for example, cellular data connection or the Internet.

Figure 3:
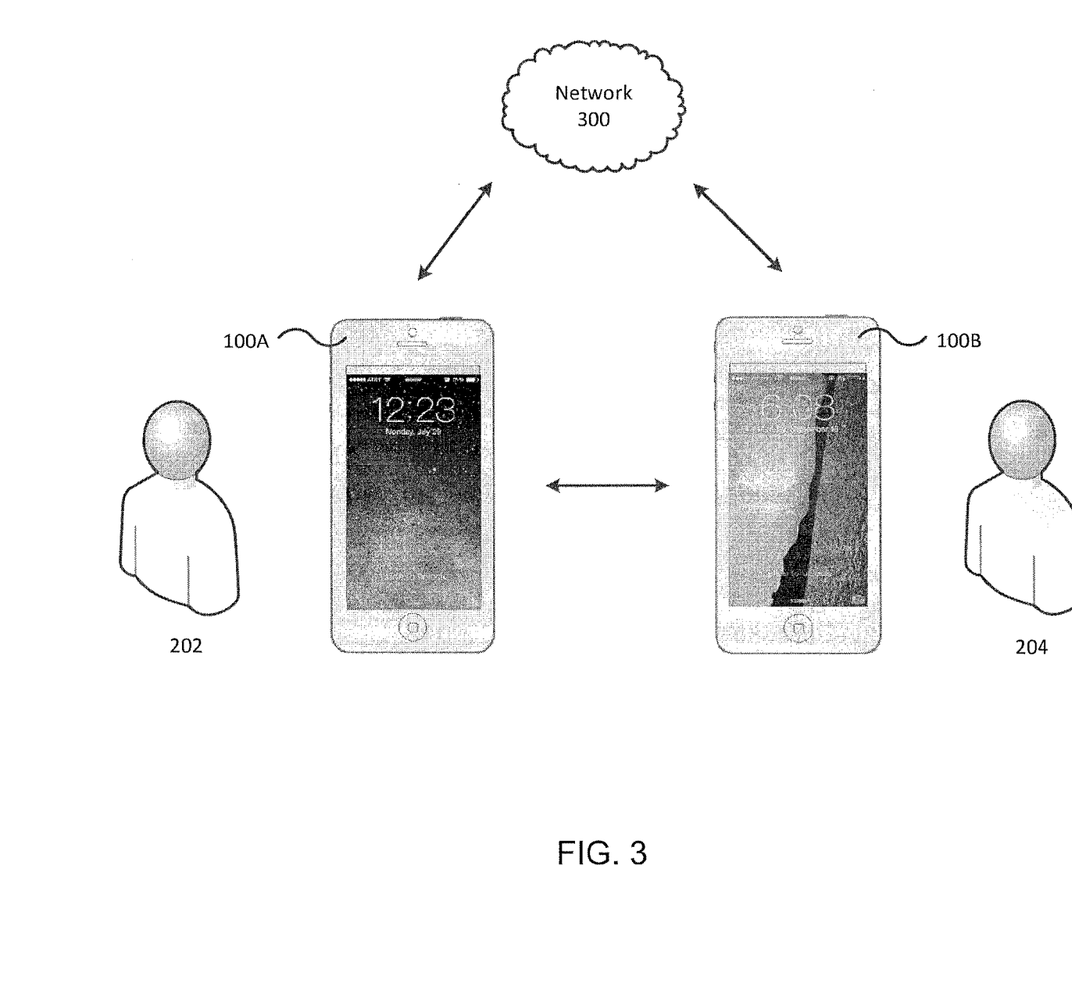
FIG. 3 is an illustration of a system including a pair of electronic devices configured to authenticate and exchange data between each other via a cloud network, according to an embodiment of the present disclosure.

FIG. 3 illustrates a first smartphone 100A and a second smartphone 100B associated with a first user 202 and a second user 204, respectively. Furthermore, the first smartphone 100A and second smartphone 100B may be connected to a network server 300. The network server 300 may be a payment provider server, such as for example, PAYPAL®, that processes payment transactions between parties. Payment transactions may be performed on a computer device such as the smartphone described in with reference to FIG. 1 of the present disclosure. However, the computer device is not limited to a smartphone but may also include other computer devices such as desktop computers, laptop computers, tablets, etc. More details of the implementation of an example payment provider server will be described later in the disclosure with reference to FIG. 7.

In some embodiments, the first and second smartphones 100A, 100B may be separated from each other by a distance that is greater than the range of the wireless connections such as Wi-Fi, Bluetooth, and/or NFC. Thus, when the first and second smartphones 100A, 100B attempt to authenticate, the smartphones may not be able to find each other. In this case, the network server 300 may be utilized to locate other smartphones that are within a set range. For example, similar to the embodiment described with reference to FIG. 2, when the first user 202 scans his fingerprint on the second smartphone 100B and the second smartphone 100B does not recognize this fingerprint as the registered fingerprint on the second smartphone 100B, the second smartphone 100B communicates with the network server 300 to search for other smartphones within a set or predetermined range. In this example, the range is greater than the typical range of the wireless connections. More specifically, the second smartphone 100B sends a geolocation of the second smartphone 100B to the network server 300. Based on the geolocation of the second smartphone 100B, the network server looks for other smartphones that have provided to the network server 300 a geolocation of the smartphones that correspond within the set or predetermined range from the second smartphone 100B. Once the network server 300 detects one or more smartphones within the range, the first user's fingerprint may be compared with the registered fingerprint on the one or more smartphone within the vicinity. This comparison may be performed at the network server 300 or it may be performed locally on the smartphone.

More specifically, according to one embodiment, the first user's fingerprint may be sent to the network server 300 and the registered fingerprint from the one or more smartphones within the range may also be sent to the network server 300. The network server 300 may then compare the fingerprints and determine if they match. If the fingerprints match, then the network server 300 indicates to the corresponding smartphones that a match has been found and the two smartphones may be authenticated.

According to another embodiment, the first user's scanned fingerprint may be provided from the second smartphone 100B to the network server 300 and the network server 300 may then send the first user's fingerprint to the smartphones located within the set range. Then, each of the smartphones within the set range may compare the received fingerprint (e.g., first user's fingerprint) with the fingerprint that is registered on its smartphone to determine whether or not the fingerprint matches with the registered fingerprint. If the fingerprints match, the smartphone will indicate the match to the network server 300, and the network server 300 may then indicate to the second smartphone 100B that a match was found for the first user's fingerprint. Accordingly, the first smartphone 100A and the second smartphone 100B are authenticated via the network server 300.

In some embodiments, the network server 300 may further be utilized to exchange data between the two smartphones. For example, the first user 202 may desire to pay the second user 204 by making a payment transaction via the network server 300. In some embodiments, an invoice where the first user owes money to the second user may be stored at the network server 300. Thus, when the first user's smartphone (i.e., first smartphone 100A) is authenticated with the second user's smartphone (i.e., second smartphone 100B), the network server 300 may be configured to automatically recognize that the first user has an outstanding invoice where he needs to pay money to the second user. Thus, an automatic payment transaction may be made from the first smartphone 100A to the second smartphone 100B via the network server 300.

In some embodiments, the network server 300 may be a social media server, such as, for example, FACEBOOK®, LINKEDIN®, etc. The user may configure his smartphone to automatically perform operations with his social media account when the smartphone is authenticated with another smartphone. For example, the first user may configure the first smartphone such that a "friend request" is automatically initiated with the second user when the first smartphone is authenticated with the second smartphone. In other embodiments, the user may configure his smartphone such that automatic actions are not performed until specifically authorized by the user each time. That is, the user may manually initiate certain operations on the smartphone such as, sending a friend request or sending money when the smartphone is authenticated.

In some embodiments, data exchange may be performed between a customer's smartphone and a merchant's system so that a customer can make a payment transaction with the merchant from his smartphone. For example, the merchant's system may include at least a computer and a biometric scanner for the customers to use. As described above with reference to FIGS. 2-3, the customer scans his fingerprint on the merchant's fingerprint scanner, and the merchant's computer searches within a set or predetermined range from the computer for smartphones that have a registered fingerprint that matches the scanned fingerprint. According to the example embodiment, the customer's smartphone is located within the set range and the customer's scanned fingerprint matches the registered fingerprint on the customer's smartphone. Based on this match, the customer's smartphone may be authenticated so that the customer can make a payment transaction with the merchant, for example, via a payment provider. In some embodiments, the customer may enable his smartphone to automatically make a payment to the merchant after the authentication or the customer may manually initiate the payment after the authentication.

In some embodiments, when the customer's smartphone is authenticated with the merchant's computer as described above, the customer's contact information (e.g., email address) may be automatically transferred to the merchant's computer. Thus, merchants may conveniently collect contact information from customers every time they make a payment transaction, which may be used, for example, for marketing purposes. In some embodiments, the customers may opt out so that contact information is not automatically transferred to the merchant unless the customer specifically authorizes the transfer.

Figure 4:
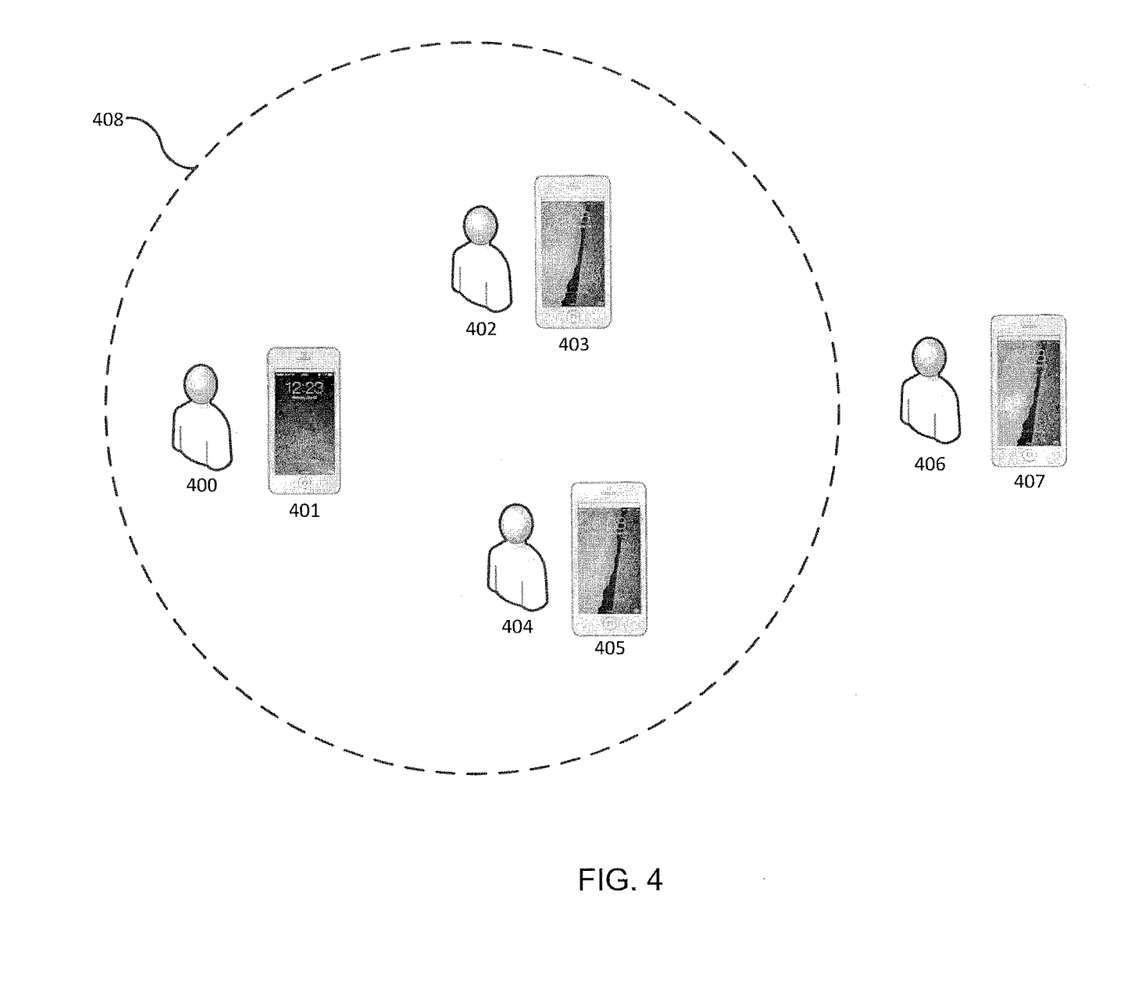
FIG. 4 is an illustration of a system including a plurality of electronic devices configured to authenticate and exchange data, according to another embodiment of the present disclosure.

FIG. 4 illustrates an exemplary embodiment of a first user 400 with a first smartphone 401, a second user 402 with a second smartphone 403, and a third user 404 with a third smartphone 405 all located within a set range from each user. The radius of the set or predetermined range is shown as circle 408. A fourth user 406 with a fourth smartphone 407 is located outside of the set distance.

According to an embodiment, all of the smartphones 401, 403, 405 that are located within the set distance 408 may be authenticated concurrently and exchange data with each other. For example, the first user 400 may scan his fingerprint on second smartphone 403 but because the first user's fingerprint is not registered on the second smartphone 403 so the second smartphone 403 searches for smartphones that are registered with the first user's fingerprint within the set range from the second smartphone 403. In this example, the second smartphone 403 find the first smartphone 401 and determines that it is registered with the first user's fingerprint and therefore the first smartphone 401 and the second smartphone 403 may be authenticated. Furthermore, third smartphone 405 is also authenticated with the first smartphone 401 and the second smartphone 403 so that the third smartphone may also exchange data with the first smartphone 401 and the second smartphone 403 without the third smartphone 405 going through a separate authentication process. That is, according to this embodiment, all smartphones located within the set range are part of the same group based on the authentication of the first and second smartphones 401, 403. However, because fourth smartphone 407 is located outside of the set range 408, fourth smartphone 407 will not be authenticated with the other smartphones.

According to one example, suppose a group of friends (e.g., first user 400, second user 402, and third user 404) are sitting around a table (e.g., at a restaurant). The range may be selected to include only the friends that are sitting around the table. Thus, the smartphones of the friends sitting around the table can exchange data with each other and exclude the smartphone of other people (e.g., fourth user 406) sitting at other tables.

Figure 5:
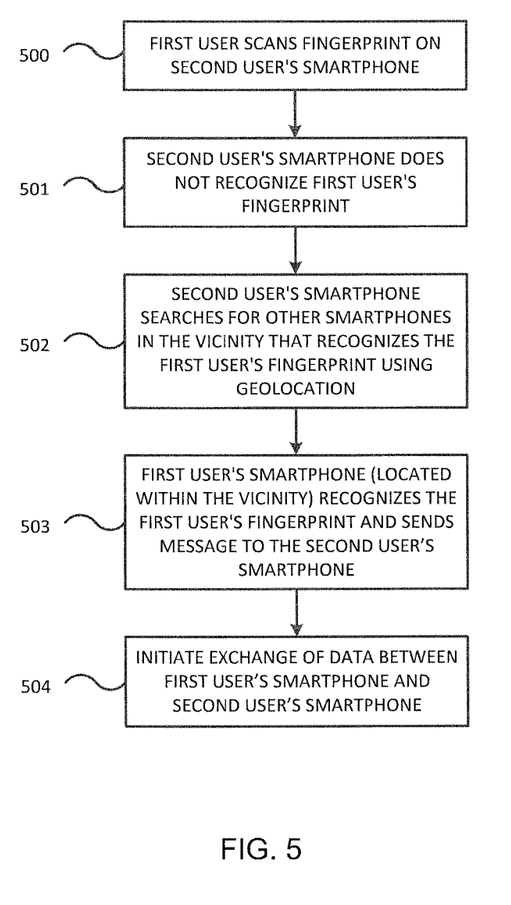
FIG. 5 is a flowchart of a process for authenticating a first smartphone with a second smartphone, according to an embodiment of the disclosure.

FIG. 5 is a flowchart of a process for authenticating a first smartphone with a second smartphone, according to an embodiment of the disclosure. The operations of FIG. 5 may be implemented with any combination of software instructions executed by the electronic device (e.g., smartphone) described with reference to FIG. 1.

In block 500, a first user scans his fingerprint on a second user's smartphone by placing his thumb or finger on a biometric scanner (e.g., a fingerprint scanner) on the second user's smartphone. Because the first user's fingerprint is not registered on the second user's smartphone, in block 501, the second user's smartphone does not recognize the first user's fingerprint. In block 502, the second user's smartphone uses geolocation to search in the vicinity of the second user's smartphone for other smartphones that are registered with the first user's fingerprint. In some embodiments, the second user's smartphone may utilize, e.g., Wi-Fi, Bluetooth, and/or NFC, to search the vicinity for other smartphones. The range of the "vicinity" may be a distance that is variable by the second user on his smartphone, or the distance may be fixed by the software application executing the instructions on the smartphone. Furthermore, the range is with reference to the distance from the smartphone that is searching for other smartphones, i.e., the second user's smartphone. In some embodiments, the second user's smartphone may utilize a network server to utilize geolocation of the smartphones to find a smartphone that has a matching fingerprint.

In block 503, the first user's smartphone is found by the second user's smartphone as having the first user's fingerprint registered on it. More specifically, the first user's smartphone compares the first user's fingerprint (that was scanned on the second user's smartphone) with the fingerprint that is registered on the first user's smartphone, and determines that the two fingerprints match. Then, the first user's smartphone sends a message via Wi-Fi, Bluetooth, and/or NFC, to the second user's smartphone of the match. Once both smartphone acknowledge the match, data may be exchanged between the two smartphone at block 504. For example, the first user's phone number may be sent from the first user's smartphone to the second user's smartphone, or the second user's email address may be sent from the second user's smartphone to the first user's smartphone. In some embodiments, social media action may be performed. For example, a FACEBOOK® friend request may be sent, or the friend may be tagged in a photo. Yet in some embodiments, financial transactions may be performed between the two users through the use of a payment provider such as PAYPAL®.

Figure 6:
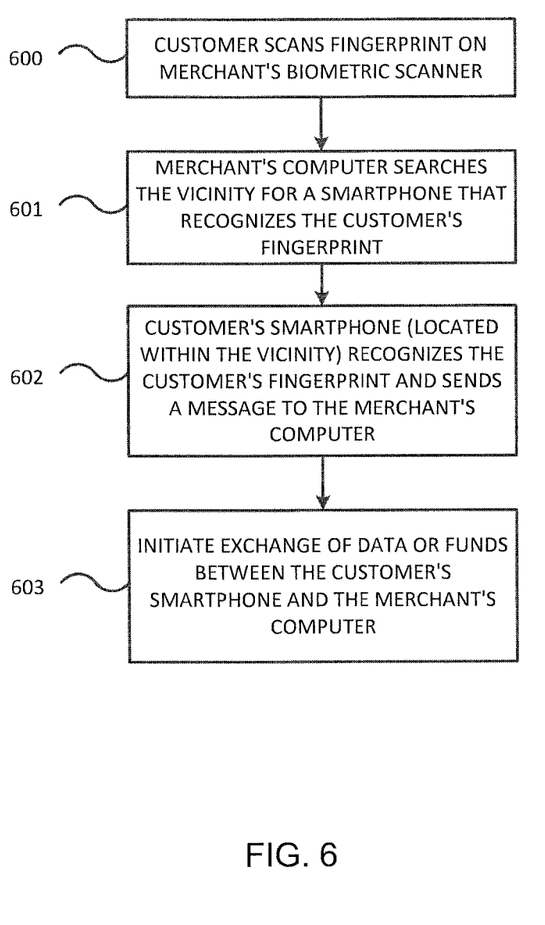
FIG. 6 is a flowchart of a process for authenticating a customer's smartphone with a merchant's computer, according to an embodiment of the disclosure.

FIG. 6 is a flowchart of a process for authenticating a customer's smartphone with a merchant's computer, according to an embodiment of the disclosure. The operations of FIG. 6 may be implemented with any combination of software instructions executed by the electronic device (e.g., smartphone) described with reference to FIG. 1.

In block 600, a customer (e.g., a customer at a retail store) scans his fingerprint on a biometric scanner (e.g., a fingerprint scanner) on the merchant's computer. In block 601, the merchant's computer searches the vicinity of the merchant's computer for a smartphone that recognizes the customer's fingerprint. The range of the "vicinity" may be a distance that is variable by the merchant from the merchant's computer, or the distance may be fixed by the software application executing the instructions on the merchant's computer. Furthermore, the range is described with reference to the distance from the location of the merchant's computer that is searching for the customer's smartphone. In some embodiments, the merchant's computer may utilize a network server to utilize geolocation of the smartphones to find a smartphone that has a matching fingerprint.

In block 602, a smartphone registered with the customer's fingerprint (i.e., customer's smartphone) is found. More specifically, the customer's smartphone compares the first user's fingerprint (that was scanned on the merchant's fingerprint scanner) with the fingerprint that is registered on the customer's smartphone, and determines that the two fingerprints match. Then, the customer's smartphone sends a message via Wi-Fi, Bluetooth, and/or NFC, to the merchant's computer that a match has been found. Once both, the merchant's computer and the customer's smartphone are authenticated, data may be exchanged and a payment transaction may be made from the customer to the merchant at block 603. For example, the merchant's computer may send an electronic invoice to the customer's smartphone indicating a balance due, and the customer's smartphone may initiate the payment transaction to the merchant via a payment provide such as, for example, PAYPAL®. In some embodiments, the merchant's computer may automatically retrieve the customer's contact information such as a phone number or email address.

Although the above description refers to fingerprint identification for performing the authentication process, other identification methods may also be utilized. For example, instead of scanning a user's fingerprint, facial features of the user may be captured with a camera to identify the user via facial recognition. In some embodiments, for example, when a biometric scanner is not available, an alphanumeric authorization code may be entered by the user on the smartphone.

Figure 7:
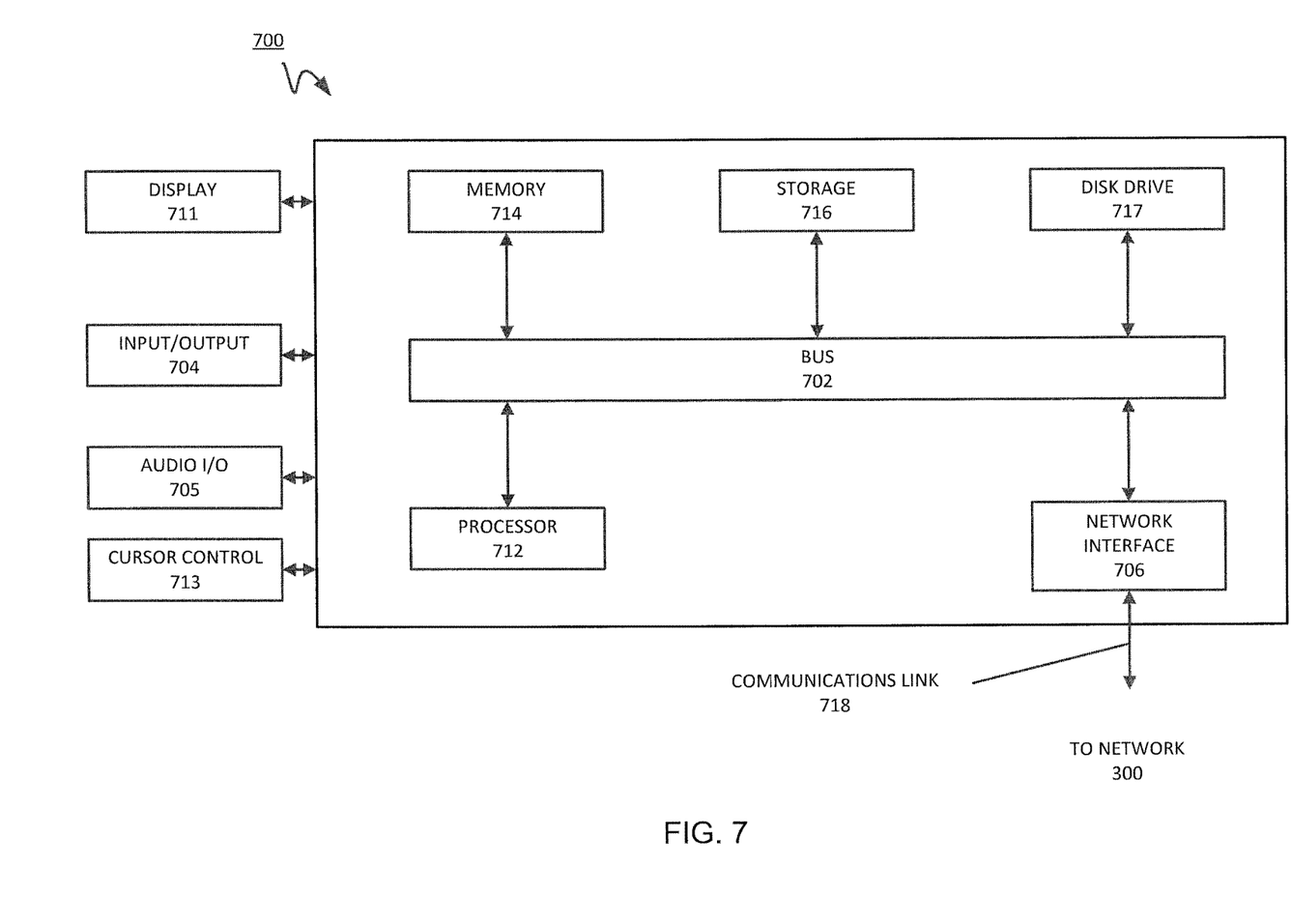
FIG. 7 is a block diagram of a computer system suitable for implementing a network server, according to an embodiment of the present disclosure.

FIG. 7 is a block diagram of a computer system 700 suitable for implementing a network server utilized for example by a payment service provider, according to one or more embodiments of the present disclosure. In various embodiments, the electronic device may comprise a personal computing device (e.g., a personal computer, laptop, smart phone, tablet, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and service/payment providers may be implemented as computer system 700 in a manner as follows.

Computer system 700 includes a bus 702 or other communication mechanism for communicating information data, signals, and information between various components of computer system 700. Components include an input/output (I/O) component 704 that processes a user action, such as selecting keys from a keypad/keyboard, selecting one or more buttons or links, etc., and sends a corresponding signal to bus 702. I/O component 704 may also include an output component, such as a display 711 and a cursor control 713 (such as a keyboard, keypad, mouse, etc.). One or more optional audio/video (A/V) input/output (I/O) components 705 may also be included to allow a user to use voice and/or video for inputting information by converting audio signals. A/V I/O component 705 may allow the user to hear audio. A transceiver or network interface 706 transmits and receives signals between computer system 700 and other devices, such as another user device, a merchant server, or a service/payment provider server via network 300. In one embodiment, the transmission is wireless, although other transmission mediums and methods may also be suitable. A processor 712, which can be a micro-controller, digital signal processor (DSP), or other processing component, processes these various signals, such as for display on computer system 700 or transmission to other devices via a communication link 718. Processor 712 may also control transmission of information, such as cookies or IP addresses, to other devices.

Components of computer system 700 also include a system memory component 714 (e.g., RAM), a static storage component 716 (e.g., ROM), and/or a disk drive 717 to store information, such as account information, transaction numbers, machine IDs, and other information described above. Computer system 700 performs specific operations by processor 712 and other components by executing one or more sequences of instructions contained in system memory component 714. Instructions may be performed by one or more processors 712. Logic may be encoded in a computer readable medium, which may refer to any medium that participates in providing instructions to processor 712 for execution. Such a medium may take many forms, including but not limited to, non-volatile media, volatile media, and transmission media. In various embodiments, non-volatile media includes optical or magnetic disks, volatile media includes dynamic memory, such as system memory component 714, and transmission media includes coaxial cables, copper wire, and fiber optics, including wires that comprise bus 702. In one embodiment, the logic is encoded in non-transitory computer readable medium. In one example, transmission media may take the form of acoustic or light waves, such as those generated during radio wave, optical, and infrared data communications.

Components of computer system 700 also include a system memory component 714 (e.g., RAM), a static storage component 716 (e.g., ROM), and/or a disk drive 717 to store information, such as account information, transaction numbers, machine IDs, and other information described above. Computer system 700 performs specific operations by processor 712 and other components by executing one or more sequences of instructions contained in system memory component 714. Instructions may be performed by one or more processors 712. Logic may be encoded in a computer readable medium, which may refer to any medium that participates in providing instructions to processor 712 for execution. Such a medium may take many forms, including but not limited to, non-volatile media, volatile media, and transmission media. In various embodiments, non-volatile media includes optical or magnetic disks, volatile media includes dynamic memory, such as system memory component 714, and transmission media includes coaxial cables, copper wire, and fiber optics, including wires that comprise bus 702. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 700. In various other embodiments of the present disclosure, a plurality of computer systems 700 coupled by communication link 718 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more machine readable mediums, including non-transitory machine readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Embodiments described herein are exemplary only. One skilled in the art may recognize various alternative embodiments from those specifically disclosed. Those alternative embodiments are also intended to be within the scope of this disclosure. As such, the embodiments are limited only by the following claims and their equivalents.

The invention claimed is:

1. A first device associated with a first user, the first device comprising:
   a non-transitory memory; and
   one or more hardware processors coupled to the non-transitory memory and configured to read instructions from the non-transitory memory to cause the first device to perform operations comprising:
   receiving from a second user, first identification data and second identification data of the second user obtained by a first sensor of the first device, wherein the first identification data and the second identification data are selected from the group consisting of: fingerprint data, facial recognition data, and alphanumeric data;
   determining that the first identification data or the second identification data of the second user does not correspond to the first device;
   searching, via a second sensor of the first device and through a wireless connection, for a second device associated with the first identification data and the second identification data of the second user and wherein the searching is within a predetermined distance from the first device;
   receiving, via the wireless connection, an indication from the second device confirming that the first identification data and the second identification data of the second user are associated with the second device;
   initiating a first data communication between the first device and the second device in response to receiving the indication confirming that the first identification data is associated with the second device; and initiating a second data communication between the first device and the second device in response to receiving the indication confirming that the second identification data is associated with the second device, wherein the first data communication and the second data communication comprise different types of transactions or have different transaction amount limits.

2. The first device of claim 1, wherein the searching comprises transmitting the received first identification data or second identification data from the first device to a plurality of devices that include the second device.

3. The first device of claim 1, wherein the first identification data and the second identification data of the second user are stored in a memory of the second device, and an identification data of the first user is stored in a memory of the first device.

4. The first device of claim 1, wherein the predetermined distance is set by the first user on the first device.

5. The first device of claim 4, wherein the operations further comprise determining a location of the first device and the second device via geolocation.

6. The first device of claim 1, wherein the wireless connection comprises a Wi-Fi connection, a Bluetooth connection, and/or an NFC connection, and wherein the first sensor and the second sensor are integrated into the first device.

7. The first device of claim 1, wherein the first data communication and the second data communication are each initiated automatically after receiving the indication from the second device, the first data communication or the second data communication comprising one or more selected from the group consisting of: an email address, a phone number, an address, an image, and funding source information.

8. The first device of claim 1, wherein the first identification data comprises a first type of fingerprint scan and the second identification data comprises a second type of fingerprint scan.

9. A transaction processing system comprising:
   a non-transitory memory; and
   one or more hardware processors coupled to the non-transitory memory and configured to read instructions from the non-transitory memory to cause the transaction processing system to perform operations comprising:
   receiving from a customer and via a first sensor of the transaction processing system, first biometric identification data and second biometric identification data of the customer;
   searching, via a second sensor of the transaction processing system and through a wireless connection, for a customer device associated with the first biometric identification data and the second biometric identification data of the customer within a predetermined distance from the transaction processing system;
   receiving, via the wireless connection, a message from the customer device confirming that the first biometric identification data and the second biometric identification data of the customer is associated with the customer device; and
   processing a first transaction in response to receiving the message confirming that the first biometric identification data is associated with the customer device; and
   processing a second transaction in response to receiving the message confirming that the second biometric identification data is associated with the customer device, wherein the first transaction and the second transaction comprise different types of transactions or have different transaction amount limits.

10. The transaction processing system of claim 9, wherein the operations further comprise sending geolocation of the transaction processing system to a network server, the network server being configured to search for the customer device within the predetermined distance from the transaction processing system.

11. The transaction processing system of claim 9, wherein the operations further comprise comparing the first biometric identification data or the second biometric identification data with a biometric identification stored in the customer device.

12. The transaction processing system of claim 11, wherein the first biometric identification data or the second biometric identification data comprises a fingerprint or a facial image.

13. The transaction processing system of claim 9, wherein the wireless connection comprises a Wi-Fi connection, a Bluetooth connection, and/or an NFC connection, and wherein the searching comprises transmitting the received first biometric identification data or second biometric identification data from the transaction processing system to a plurality of devices that include the customer device.

14. The transaction processing system of claim 9, wherein the operations further comprise automatically sending an invoice to the customer device, and receiving a payment from a payment provider in response to the invoice.

15. The transaction processing system of claim 9, wherein the first biometric identification data comprises a first type of fingerprint scan and the second biometric identification data comprises a second type of fingerprint scan.

16. A method for authenticating users on an electronic device, the method comprising:
   receiving, by a first device of a first user, first biometric identification data and second biometric identification data of a second user obtained via a first sensor of the first device;
   determining that the first biometric identification data and the second biometric identification data of the second user are not associated with the first device;
   searching, via a second sensor of the first device and through a wireless connection, for a second device associated with the first biometric identification data and the second biometric identification data of the second user and wherein the searching is within a predetermined distance from the first device;
   receiving, via the wireless connection, an indication from the second device confirming that the first biometric identification data or the second biometric identification data of the second user is associated with the second device; and
   initiating a first data communication between the first device and the second device in response to receiving the indication confirming that the first biometric identification data is associated with the second device; and
   initiating a second data communication between the first device and the second device in response to receiving the indication confirming that the second biometric identification data is associated with the second device, wherein the first data communication and the second data communication comprise different types of transactions or have different transaction amount limits.

17. The method of claim 16, wherein the first biometric identification data of the second user is a first fingerprint of the second user, and the second biometric identification data of the second user is a second fingerprint of the second user, the first fingerprint or the second fingerprint being obtained by scanning the fingerprint on the first sensor that includes a fingerprint scanner.

18. The method of claim 16, further comprising retrieving biometric identification data of the first user stored on the first device and comparing the biometric identification data of the first user with the first biometric identification data or the second biometric identification data of the second user.

19. The method of claim 18, wherein the biometric identification data of the first user is stored in a memory of the first device or in a memory of a network server.

20. The method of claim 16, further comprising determining a location of the first device based on geolocation.

* * * * *